Patented Jan. 18, 1944

2,339,707

UNITED STATES PATENT OFFICE 2,339,707

METHOD FOR COATING PAPER

Otto Kress and Charles E. Johnson, Appleton, Wis., assignors to The Institute of Paper Chemistry, Appleton, Wis., a corporation of Wisconsin No Drawing. Application December 13, 1939, Serial No. 308,944

2 Claims. (Cl. 106—142)

The present invention relates to compositions adaptable for use in the paper art and more particularly to aqueous emulsions containing non-volatile solid material and volatile water-insoluble liquid material and the use of the same in the manufacture of improved paper.

The principal object of the present invention is to provide compositions for use in the manufacture of improved paper.

Other objects of the present invention will be apparent as the description hereinafter proceeds.

We have discovered that paper of improved brightness and increased opacity can be readily prepared by first treating a paper web or sheet with an aqueous emulsion containing as essential ingredients a non-volatile solid material and a volatile water-insoluble liquid, and thereafter subjecting the treated web to a heat treatment in order to remove the volatile liquid. The following preferred procedure will serve to illustrate the preparation of an emulsion of and for use in the present invention.

About 40 pounds of a water-insoluble, alkali-soluble protein, such for example as an animal casein such as milk protein or a vegetable casein such as soya bean protein, is first stirred into about 160 pounds of water at a temperature of approximately 140° F. As soon as the protein is wetted about 1.2 pounds of caustic soda dissolved in 10 pounds of water is added to the protein dispersion and the mixture subjected to mild agitation until solution of the protein is obtained. About 7.5 pounds of an emulsifying agent, e. g. ammonium oleate, is next added to the protein solution and the resulting mixture subjected to an additional mixing for a short period, e. g. 15 minutes, to allow for the solution of the emulsifying agent. The solution is then allowed to cool to a temperature of approximately 120° F. (the temperature depending on the boiling point of the material to be emulsified), after which is slowly added under constant stirring in a fine stream about 120 pounds of a volatile oil or liquid such as kerosene. The stirring is conveniently accomplished through the use of a high speed type of mixer known in the trade as the Lightnin mixer, which may operate at a speed varying from 600 R. P. M. to 1700 R. P. M. After the kerosene or like material has been thoroughly emulsified with the protein preferably through the use of soap or other emulsifying agent, the emulsion is diluted with water to the desired concentration and is ready for use.

The emulsions of the present invention prepared, for example, as described above should be applied to the formed web or paper sheet and are not suitable for use in the beater prior to web formation. The emulsions may be applied in the usual manner at the size press or applied by spraying, or by any other of the various procedures used for coating paper after sheet formation. After the application of the emulsion to the paper the paper is subjected to a final heat or drying treatment in order to remove the water and the volatile liquid, e. g. kerosene. In the heat treatment which may be carried out on the ordinary driers of the paper machine or by festoon drying by hot air, sufficient heat is used to volatilize or evaporate the water-insoluble oily liquid.

The method outlined above provides a satisfactory and relatively cheap means for brightening and opacifying the finished sheet and for increasing the uniformity of formation, as well as the oil resistance and strength of the finished sheet. It is customary to secure opacity by the addition at the beater of so-called fillers, which are mineral pigments; the addition of such fillers will brighten the sheet and increase its opacity, but at the same time will tend to reduce the strength and oil resistance of the sheet. Moreover, unless very expensive fillers such as titanium dioxide are used, a very large percentage of filler must be incorporated in the sheet; this, in turn, very decidedly reduces the strength of the sheet, increases its weight unduly, and reduces its oil resistance. We do not intend in this application to come into conflict with what is normally known as coated paper, which is made by using a dispersion of starch, casein, glue etc. into which is admixed a pigment or filler, and the mixture is then applied as a surface coating to the sheet. Such a treatment is expensive and decidedly increases the weight of the sheet, as a relatively heavy coating must be applied to secure the desired opacity.

The solid material or protein remaining on the paper (which is not dependent on acidity for the breaking of the emulsion) does not form a continuous film, but is in very fine, submicroscopic particle size and gives the effect of producing a sheet of more uniform formation. The light striking the small particles is refracted producing the unique increase in opacity,—an improvement not obtainable by applying, for example, casein dissolved in alkali or other solvent. No appreciable increase in opacity or brightness is secured when a material, such as protein, is applied by itself in accordance with prior practices and forms continuous films.

The paper treated in accordance with the present invention possesses a very decided advantage in that it is relatively resistant to penetration of oils, although the surface of the paper is not disturbed by the treatment insofar as its receptivity toward ordinary writing inks is concerned. These characteristics, i. e., resistance to oil penetration and high surface ink receptivity, make the paper treated with the emulsions of the present invention of special interest for certain types of printing papers in which excessive oil penetration is not desired. The papers treated in accordance with the present invention in addition, are more readily erased,—especially in the case of typewriter ink. This is believed to be due to the fact that the ink does not penetrate into the body of the sheet but lies more upon the surface. It will be understood, however, that the present invention is not limited by any theoretical explanations discussed herein.

The non-volatile solid materials suitable for use in the present invention should be in aqueous solution and in the case of the proteins (which are in alkaline dispersion) should be water-insoluble and alkali-soluble, and preferably of the casein type of which milk casein and soya bean alpha protein are examples. The alkali, such as caustic soda used in the above illustrative example, may be replaced in whole or in part by other alkaline materials, such as ammonia, sodium carbonate, borax, disodium phosphate, sodium, silicate, etc., or any of the other alkalies normally employed for the purpose of cutting or dissolving water-insoluble proteins, such as casein.

The kerosene used in the above illustrative example may also be replaced in whole or in part by other inert, organic liquids, e. g. the hydrocarbons, or mixtures of the same which are not miscible with water under normal conditions. The preferred oil, which should be water-white and must leave no odorous residues after drying, should have a flash point of about 115° to 150° F. and a fire point of approximately 130° to 180° F. The oil should not contain heavy or high boiling point residues which cannot be driven from the treated sheet by the temperature employed either in drying on steam cylinders or by hot air drying. Naturally, oils of lower or higher flash and fire point than indicated above could be employed, provided precautions were taken for the removal of all of the oily residues which might be present in the oil, as such oily residues will tend to lubricate the fibers and thereby reduce the strength characteristics of the finished sheet.

Although we prefer to employ an emulsifying agent such as ammonium oleate, or other agents of the nature of the sulfonated oils, triethanolamine, etc, as an aid in the formation of the emulsion, the addition of or use of an emulsifying agent is not essential. We have found, for example, that a satisfactory product can be made by omitting the emulsifying agent entirely and by depending upon, for example, the alkaline solution of casein and the agitation for the proper emulsification of the water-insoluble organic liquid oily material.

It will be understood that the compositions of the present invention may be produced in a variety of ways and that various materials may be incorporated to produce satisfactory emulsions coming within the scope of the present invention. The emulsions should contain as essential ingredients (1) water, i. e. they should be aqueous emulsions; (2) an inert, oily, water-insoluble volatile liquid; and (3) a non-volatile solid material which separates from the emulsion in very fine particle form, i. e. does not produce a continuous film, when the water and oily-liquid are removed by evaporation or volatilization. The drying operation breaks the emulsion, and the evaporation of the emulsified oily material is responsible for producing the minute or submicroscopic particles of non-volatile brightening material and opacifying agent on the surface of the treated paper.

It will be understood by those skilled in the art that our invention is not limited to the temperatures and proportions of the various ingredients employed in our preferred process described above. For example, our investigations have shown that a 3:1 to 1:3 volatile water-insoluble organic liquid to solid material ratio may be employed. The use of a 4:1 or even 5:1 organic liquid to solid material ratio may also be employed although the use of such large amounts of emulsified organic liquid is ordinarily not necessary and is avoided in commercial practice. When using protein a 3:1 to 1:3 organic liquid to protein ratio has been found most desirable with a 3:1 to 1:1 oily material to casein protein ratio being preferred. The temperature of the dispersion on addition of the organic liquid should be substantially below the boiling point of the organic liquid. A temperature of about 120° F. (as illustrated in the preferred example) has been found satisfactory when emulsifying kerosene.

It will be understood by those skilled in the art that the concentration of the emulsion and/or the amount applied to the paper web will govern the results obtained. The optimum concentrations (ordinarily from 20 to 45 per cent) and amounts of emulsion to be used (which may vary with different types of paper) may be determined by preliminary laboratory experiment.

It will likewise be understood by those skilled in the art that the present invention is not limited to the above illustrative examples. All modifications of the present invention are intended to be covered by the claims annexed hereto.

We claim:

1. In the paper art, the method of brightening and opacifying paper which comprises treating a pre-formed paper web with an aqueous emulsion consisting essentially of a volatile hydrocarbon liquid with a flash point of about 115°–150° F., a water-soluble soap and an alkaline dispersion of casein, and thereafter subjecting the treated web to a drying treatment in order to evaporate the liquid material of said emulsion including the hydrocarbon liquid and leave the casein on the surface of said web in extremely fine particle size.

2. In the paper art, the method of brightening and opacifying paper which comprises treating a pre-formed paper web with an aqueous emulsion consisting essentially of kerosene with a flash point of about 115°–150° F., ammonium oleate and an alkaline dispersion of casein, and thereafter subjecting the treated web to a drying treatment in order to evaporate the liquid material of said emulsion including the kerosene and leave the casein on the surface of said web in submicroscopic particle size.

OTTO KRESS.
CHARLES E. JOHNSON.

CERTIFICATE OF CORRECTION.

Patent No. 2,339,707.  January 18, 1944.

OTTO KRESS, ET AL.

It is hereby certified that error appears in the printed specification of the above numbered patent requiring correction as follows: Page 2, first column, line 31-32, for "sodium, silicate" read --sodium silicate--; and that the said Letters Patent should be read with this correction therein that the same may conform to the record of the case in the Patent Office.

Signed and sealed this 14th day of March, A. D. 1944.

Leslie Frazer
Acting Commissioner of Patents.

(Seal)